(12) United States Patent
Gillen

(10) Patent No.: US 6,697,684 B2
(45) Date of Patent: Feb. 24, 2004

(54) PROGRAMMABLE FIELD MEASURING INSTRUMENT

(76) Inventor: Thomas Gillen, Wallstrasse 5, D079650 Schopfheim (DE)

( * ) Notice: Subject to any disclaimer, the term of this patent is extended or adjusted under 35 U.S.C. 154(b) by 534 days.

(21) Appl. No.: 09/784,712

(22) Filed: Feb. 15, 2001

(65) Prior Publication Data

US 2003/0208290 A1 Nov. 6, 2003

Related U.S. Application Data

(60) Provisional application No. 60/182,439, filed on Feb. 15, 2000.

(51) Int. Cl.[7] .............................. G05B 11/01; G01N 1/00
(52) U.S. Cl. ............................... 700/66; 702/91; 73/23.2
(58) Field of Search .............................. 700/12, 52, 53, 700/65, 66; 702/91; 73/23.2, 23.3; 324/115; 356/375, 376

(56) References Cited

U.S. PATENT DOCUMENTS

| | | | |
|---|---|---|---|
| 5,790,432 A | * | 8/1998 | Morys |
| 5,946,641 A | * | 8/1999 | Morys |
| 5,948,962 A | | 9/1999 | Matthiessen ................ 73/23.2 |
| 5,987,343 A | * | 11/1999 | Kinast |
| 6,053,031 A | * | 4/2000 | Kullik et al. |
| 6,195,165 B1 | * | 2/2001 | Sayegh |
| 6,623,616 B1 | * | 9/2003 | Malver et al. |
| 2003/0033032 A1 | * | 2/2003 | Lind et al. |

FOREIGN PATENT DOCUMENTS

| | | |
|---|---|---|
| DE | 197 32 546 | 7/1997 |
| DE | 299 07 909 | 5/1999 |
| EP | 0 940 743 | 9/1999 |
| WO | WO 97/19396 | 5/1997 |
| WO | WO 97/19397 | 5/1997 |

* cited by examiner

*Primary Examiner*—Emanuel Todd Voeltz
(74) *Attorney, Agent, or Firm*—Bose McKinney & Evans LLP

(57) ABSTRACT

A programmable field measuring instrument includes a control unit, and a connector terminal, and a software protection device. The control unit executes a control program. The connector terminal is connected to the software protection device such that the software protection device may be released from the connector terminal. The software protection device includes a connector mating element with an integrated electronic component which allow authorization examination by the control unit.

19 Claims, 1 Drawing Sheet

PROGRAMMABLE FIELD MEASURING INSTRUMENT

REFERENCE TO OTHER APPLICATIONS

This application claims the benefit of U.S. Provisional Application No. 60/182,439, filed Feb. 15, 2000 entitled "Programmable Field Measuring Instrument", the disclosure of which is hereby incorporated by reference.

FIELD OF THE INVENTION

The invention relates to a programmable field measuring instrument.

BACKGROUND OF THE INVENTION

Field measuring instruments which measure a process variable in a process sequence are often used in automation and process control technology. Field measuring instruments for determining flow rate, filling level, differential pressure, temperature, etc., are generally known. In order to acquire the corresponding process variable, mass flow or volumetric flow, filling level, pressure, temperature, etc., the field measuring instruments must be arranged in direct proximity to the relevant process component. The field instruments each generate measurement signals which are a measure of the acquired process variable. The measurement signals are forwarded to a control center or a control system. As a rule, the entire process control takes place from the control center, where the various measurement signals from different field measuring instruments are evaluated and, on the basis of the evaluation, control signals are generated for field instruments (actuators) which control the process sequence. The signal transmission between field measuring instrument and control center, is effected e.g. via a current loop or via a digital databus.

More and more programmable field measuring instruments are being used in addition to analog field measuring instruments. ASICs (application-specific integrated circuits) and SMDs (surface mounted devices) are often used for this purpose.

In the case of programmable field measuring instruments, more and more "intelligence" is being displaced into the field to the actual measurement location.

This means that different functionalities are possible on site; for example, the way in which the measurement data are stored may vary, the correction of measurement data on the basis of calibration factors may be done in different ways, the measurement data acquisition and measurement data evaluation may be different, additional regulating and actuating functions may be built in, the signal transmission to the control center may vary, and there may also be different ways of providing self-monitoring of the field measuring instrument (predictive maintenance). The field measuring instrument no longer communicates just a simple measurement signal, but rather an already conditioned measurement signal and possibly further additional information as well to the control center or to other field measuring instruments.

The sum of these possibilities mentioned above makes up the functionality of the field measuring instrument. A corresponding control program (software) is necessary for each functionality. This control program is normally stored in a nonvolatile memory in the sensor. Consequently, the functionality of a field measuring instrument depends to a critical extent on the control program which, as a rule, is made available by the manufacturer of the field measuring instrument. Such a control program may encompass certain basic functions (basic functionality) or extended functionalities as well.

The control program is normally implemented during the production of the field measuring instrument. In other words, the functionality of the field instruments is thus fixedly predetermined after the latter has been produced, and cannot be changed in a simple manner. To do so would require reprogramming, that is to say a change to the control program in the field measuring instrument. Such reprogramming of a field measuring instrument is very complicated, however. Another possibility of effecting the change is to exchange the memory holding the old control program for a memory holding a new control program on site. To that end, the housing of the field measuring instrument must be opened and the memory exchanged manually, by a service engineer. During this time the voltage supply of the field measuring instrument is, of course, switched off and measurement signals cannot be transmitted to the control center. If the field measuring instrument is connected to the control center via a digital databus, then the field instrument must be reinitialized, after the memory has been exchanged, on the databus. A further possibility for effecting reprogramming consists in connecting the field measuring instrument e.g. to a portable personal computer (e.g. laptop) and "playing in" the new control program. This requires a reprogrammable memory in the field measuring instrument. These possibilities are relatively complicated and in both cases the acquisition of the process variable is interrupted for a relatively long time. A further possibility would consist in already storing different control programs during the production of the field measuring instrument, and in selecting the desired control program on site. This could be done e.g. using a simple microswitch. Since program development causes considerable costs, depending on complexity and scope, field measuring instruments with different functionalities differ in price, among other things. A simple solution using a microswitch is not able, therefore, to preclude misuse, that is to say the selection of a control program without authorization.

EP-B 0537738 "Method of protecting computer software . . . " and EP-A 0940 743 "Compact transparent dongle device" each disclose software protection devices and corresponding methods. These known software, protection devices are normally connected to the parallel interface of the personal computer (PC) used. The user calls up a specific program e.g. via a Windows interface and the selected program identifies whether or not the software protection device needed for authorization is present. Only if the required software protection device is present is the selected program executed properly, otherwise the program is terminated. In this case, however, the program selection is effected manually by the respective program user.

SUMMARY OF THE INVENTION

The object of the invention is to provide a programmable field measuring instrument which prevents unauthorized use of functionalities.

This object is achieved by means of a programmable field measuring instrument having a control unit, which serves for executing a control program and which has, as an interface, a connector terminal, which is connected, in a manner that allows it to be released, to a software protection device essentially comprising a connector mating element with an integrated electronic component, which allows authorization examination by the control unit.

In a preferred embodiment of the invention, the electronic component comprises a microcontroller whose control program memory is protected or can be protected against read-out.

In a preferred embodiment of the invention, the electronic component comprises a peripheral interface controller.

In a preferred embodiment of the invention, the update terminal of the field measuring instrument is used as the connector terminal.

In a preferred embodiment of the invention, the control unit comprises a microprocessor.

Furthermore, the invention comprises a method for the protection of software in a field measuring instrument having a control unit and a memory with different control program variants, having the following method steps:

start of an initialization routine of the control unit, interrogation of the identifier of a software protection device connected, in a manner that allows it to be released, to the field measuring instrument, selection of a control program variant by the control unit on the basis of the identifier.

In a preferred embodiment of the invention, with the interrogation, a random quantity Z generated in the control unit is sent to the software protection device. From said random quantity, new values $X1=F1(Z)$ and $X2=F2(Z)$ are calculated in each case according to an algorithm in the control unit and in the software protection device and are compared with one another in the control unit. In the absence of correspondence $X1 \neq X2$, a program stop is effected.

In a preferred embodiment of the invention, the identifier is transmitted with the result value of the algorithm, said result value having been calculated in the software protection device, and is evaluated in the control unit.

BRIEF DESCRIPTION OF THE DRAWINGS

The invention is explained in more detail below using a preferred exemplary embodiment which is illustrated in the drawing, in which.

DETAILED DESCRIPTION OF EXEMPLARY EMBODIMENTS

Figure 1:
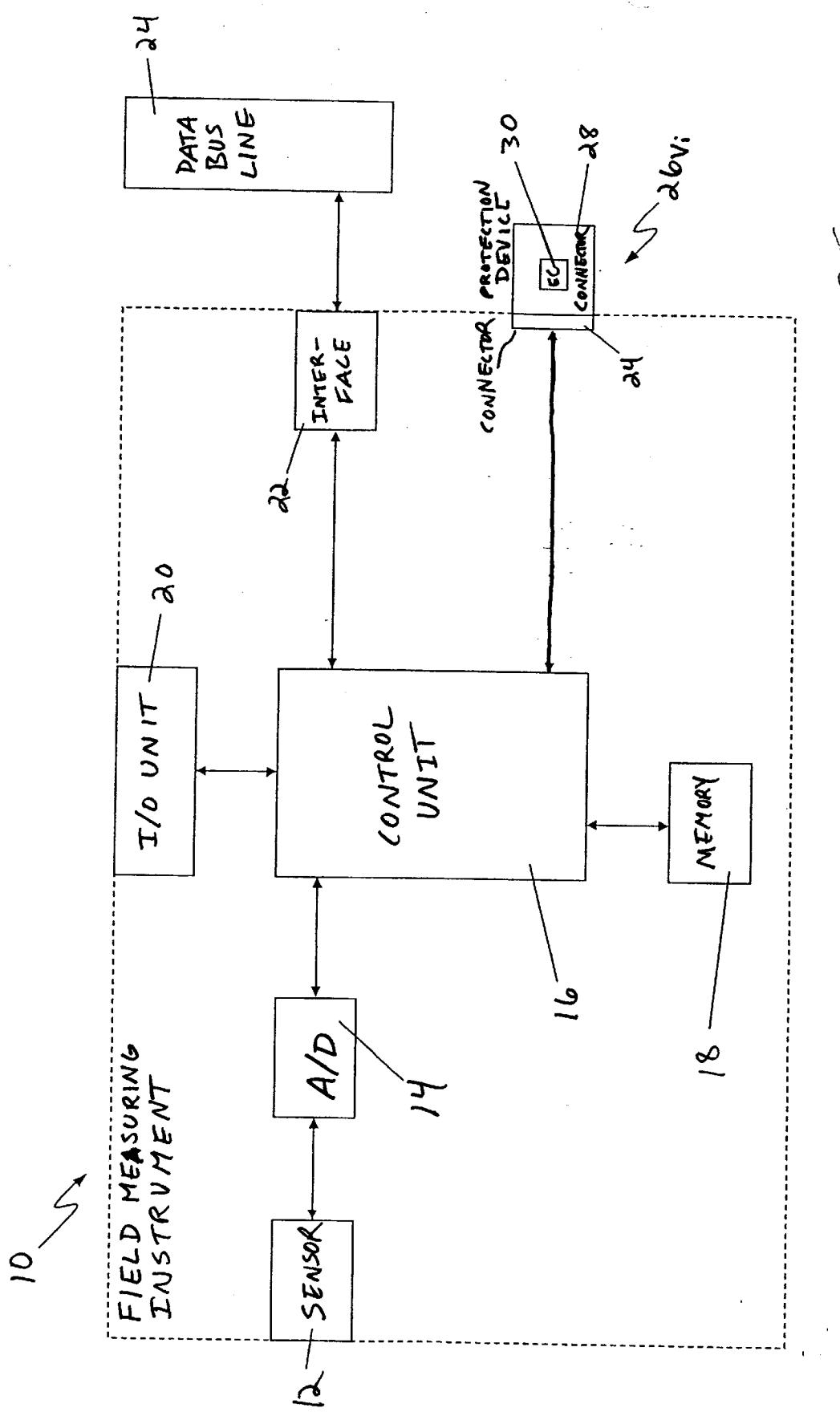
FIG. 1 shows a schematic illustration of a field measuring instrument connected to a software protection device.

While the invention is susceptible to various modifications and alternative forms, an exemplary embodiment thereof has been shown by way of example in the drawings and will herein be described in detail. It should be understood, however, that there is no intent to limit the invention to the particular form disclosed, but on the contrary, the intention is to cover all modifications, equivalents, and alternatives falling within the spirt and scope of the invention as defined by the appended claims.

FIG. 1 illustrates a field measuring instrument 10. The field measuring instrument 10 has a sensor 12, which acquires a process variable (e.g. pressure, temperature, flow rate). The analog measurement signal is converted into a digital measurement signal in an A/D converter 14 and fed to a control unit 16, which has a microprocessor, for example. The measurement signal is evaluated in the control unit 16.

A nonvolatile memory 18 connected to the control unit 16 serves as the control program memory. In addition to the control program, important parameters (e.g. calibration factors) are also stored in the memory 18. The nonvolatile memory 18 may be, for example, an EEPROM, a flash memory, EPROM, etc.

An input/output unit 20 connected to the control unit 16 serves for indicating the measured value and for manual inputting. The control unit 16 communicates via an interface 22 with a control center (not specifically illustrated) which controls the entire process sequence. The communication can take place e.g. via the databus line DBL. However, other communications links with the control center are also conceivable. For digital communication, an ASIC from Siemens SPC4 can be used as the interface 22. The communication takes place according to the Profibus PA Standard. For the other links, a HART modem, a Foundation Fieldbus Controller or a CAN Controller can be used as the interface 22. The communication then takes place according to the Hart or Foundation Fieldbus or CAN Standard. These international standards are generally known. Furthermore, the field measuring instrument 10 has an externally accessible connector terminal 24, which is connected to the control unit 16 and serves as an interface. Since the data exchange via this interface is relatively limited, a serial interface is sufficient. This interface may be an additional interface or else an update interface already present. The second alternative is expedient particularly in the case of systems based on the CAN Standard. The connector terminal 24 can be connected to a software protection device 26, which comprises a matching connector mating element 28 in which an electronic component 30 is integrated, which allows authorization examination by the control unit 16. The way in which the authorization examination is effected will be discussed in more detail further below.

A control program is stored in the memory 18, which control program is loaded and called up during, the initialization of the control unit 16. This control program is stored in the memory 18 e.g. during the production of the field measuring instrument F. The control program encompasses a number of variants V1, V2, etc. The variants V1, V2, etc., realize different functionalities of the field measuring instrument with regard to e.g. measurement signal acquisition, measurement signal evaluation, calibration, input/output functions, communication, self-monitoring, etc. Thus, the variant V1 may generate a basic functionality of the field instrument, and the variant V2, on the other hand, an extended functionality.

If the sensor 12 is exchangeable, then the variants Vi may even differ in terms of the measurement principle (e.g. temperature measurement, differential pressure). For each variant Vi there is a software protection device $26_{vi}$ which activates the respective variants. In other words, if the software protection device $26_{vi}$ is connected to the connector terminal 24, then the variant Vi executed by the control unit 16 is precisely the one which allows an entirely specific functionality or a combination of certain functionalities. Every other variant is disabled, that is to say the control unit 16 cannot execute these variants. By virtue of the fact that a control program with different variants Vi are already stored during the production of the field instrument 10, they can be activated by a corresponding software protection device $26_{vi}$. The customer requires the "correct" software protection device $26_{vi}$, which must be connected to the field instrument 10 in order to obtain the functionality of the field instrument 10 that he desires. The software protection device $26_{vi}$ can be dispatched e.g. by mail. The functionality of the field instrument 10 can be changed simply by exchanging the software protection device $26_{vi}$. This can therefore be realized very rapidly and simply. In certain cases, there is not even an interruption in the recording of measured values, so that the exchange is imperceptible from the control center. Sufficient program protection is ensured by the software protection device $26_{vi}$.

The electronic component 30 used may be e.g. a PIC module (peripheral interface controller). Such a PIC module allows simple data processing and data communication. It is only one-time programmable and cannot be read. A specific PIC module PIC 12C5XX is produced by Microchip Technology Inc. However, other microcontrollers which do not require much space and are protected against read-out (e.g. from Scenix, Atmel, Mitsubishi, etc.) are also conceivable.

In a simple manner, the connector terminal 24 also serves as an update interface of the field measuring instrument 10, via which e.g. new control programs and/or data (e.g. parameterization factors) can be transferred to the memory 18.

The control unit 16 preferably includes a microprocessor.

The authorization examination of the software protection device 26 is explained in more detail below.

After an initialization routine of the field measuring instrument 10 e.g. after a voltage interruption, an identifier Ki of the software protection device $26_{vi}$ is interrogated by the control unit 16. On the basis of the identifier, the corresponding variant Vi is then activated, that is to say the control unit 16 operates according to the variant Vi and affords the functionality corresponding to the variant Vi.

This interrogation must be repeated at certain time intervals in order to preclude the use of a software protection device Vi in different field measuring instruments.

This identifier Ki can be stored e.g. in a simple manner in an electrically programmable memory (EPROM) as electronic component 30.

Since an EPROM can easily be read, this software protection is not very extensive. PIC modules are better suited for this purpose.

Better protection is afforded by methods in which a random quantity is generated in the control unit 16, the value of which random quantity changes randomly in a certain sense over the course of time, e.g. the sum of elapsed-hour meter and present measured value. This random value Z is sent to the software protection device 26. From the random value Z, new values X1=F1(Z) and X2=F2(Z) are calculated in the control unit 16 and the software protection device 26, in each case according to an algorithm stored therein, and are compared with one another in the control unit 16. If the value X2 transmitted by the software protection device $26_{vi}$ to the control unit 16 does not correspond to the value X1, then only certain basic functionalities are activated. In a more stringent variant, a program stop would also be possible. The two values X1 and X2 correspond only when the two stored functions F1 and F2 are identical.

In a preferred embodiment, the value X2 and the identifier Ki are combined to form a transmission quantity in the software protection device $26_{vi}$ and transmitted to the control unit 16. Multiplication of Ki and X2 is conceivable. In the control unit, the identifier Ki is recovered from the transmission quantity. This can be done e.g. by division by X1. Only if X1 and X2 correspond is a meaningful identifier Ki determined, in the control unit 16, on the basis of which a variant can be selected.

In a programmable field measuring instrument 10 effective control program protection is achieved by the use of a software protection device $26_{vi}$ which can be exchanged in a simple manner.

While the invention has been illustrated and described in detail in the drawing and foregoing description, such illustration and description is to be considered as exemplary and not restrictive in character, it being understood that only an exemplary embodiment has been shown and described and that all changes and modifications that come within the spirit of the invention are desired to be protected.

What is claimed is:

1. A programmable field measuring instrument having a control unit, which serves for executing a control program and which has, as an interface, a connector terminal, which is connected, in a manner that allows it to be released, to a software protection device essentially comprising a connector mating element with an integrated electronic component, which allows authorization examination by the control unit.

2. The programmable field measuring instrument as claimed in claim 1, in which the electronic component comprises a microcontroller whose control program memory is protected or can be protected against read-out.

3. The programmable field measuring instrument as claimed in claim 1, in which the electronic component comprises a peripheral interface controller.

4. The programmable field measuring instrument as claimed in claim 2, in which the electronic component comprises a peripheral interface controller.

5. The programmable field measuring instrument as claimed in claim 1, in which the connector terminal serves as an update terminal of the field measuring instrument.

6. The programmable field measuring instrument as claimed in claim 2, in which the connector terminal serves as an update terminal of the field measuring instrument.

7. The programmable field measuring instrument as claimed in claim 3, in which the connector terminal serves as an update terminal of the field measuring instrument.

8. The programmable field measuring instrument as claimed in claim 4, in which the connector terminal serves as an update terminal of the field measuring instrument.

9. The programmable field measuring instrument as claimed in claim 2, in which the control unit comprises a microprocessor.

10. The programmable field measuring instrument as claimed in claim 2, in which the control unit comprises a microprocessor.

11. The programmable field measuring instrument as claimed in claim 3, in which the control unit comprises a microprocessor.

12. The programmable field measuring instrument as claimed in claim 4, in which the control unit comprises a microprocessor.

13. The programmable field measuring instrument as claimed in claim 5, in which the control unit comprises a microprocessor.

14. The programmable field measuring instrument as claimed in claim 6, in which the control unit comprises a microprocessor.

15. The programmable field measuring instrument as claimed in claim 7, in which the control unit comprises a microprocessor.

16. The programmable field measuring instrument as claimed in claim 8, in which the control unit comprises a microprocessor.

17. A method for the protection of software in a field measuring instrument having a control unit and a memory with different control program variants, having the following method steps:

A) start of an initialization routine of the control unit,

B) interrogation of the identifier of a software protection device connected, in a manner that allows it to be released, to the field measuring instrument, C) selection of a control program variant by the control unit on the basis of the identifier.

18. The method as claimed in claim 17, in which, with the interrogation, a random quantity generated in the control unit is sent to the software protection device, from which new values $X1=F1(Z)$ and $X2=F2(Z)$ are calculated according to an algorithm both in the control unit and in the software protection device, which values are compared with one another in the control unit and, in the absence of correspondence $X1 \neq X2$, only a basic functionality is activated.

19. The method as claimed in claim 18, in which the identifier is transmitted with the value $X2$ calculated in the software protection device and is evaluated in the control unit.

* * * * *